Oct. 13, 1931.  F. RIEBER  1,827,371

METHOD AND MEANS FOR GEOLOGICAL EXPLORATIONS

Filed March 14, 1925

INVENTOR
Frank Rieber
BY
White Prost Evans
his ATTORNEYS

Patented Oct. 13, 1931

1,827,371

UNITED STATES PATENT OFFICE

FRANK RIEBER, OF SAN FRANCISCO, CALIFORNIA

METHOD AND MEANS FOR GEOLOGICAL EXPLORATIONS

Application filed March 14, 1925. Serial No. 15,528.

This invention relates to a scheme for ascertaining facts relative to geologic deposits below the earth's surface; and particularly to such a scheme that can be used without making exploratory borings.

It has been proposed in the past to localize reasonably abrupt changes in the physical properties of the earth structure below the surface, such for example as stratification, by providing apparatus sensitive to the reception of waves reflected from the strata surfaces. It is evident that the localization of such a stratum then involves the solution of a trigonometric problem, for it is a simple matter to generate such waves at any desired point and to receive the reflected wave at any other desired point. In such prior systems, however, reliable information was difficult to obtain except in exceptional cases, for many disturbing influences are present, which if not nullified, cause the record of the reception of the reflected wave to be practically obscured.

It is one of the objects of my invention to make it possible to localize such strata with certainty, and without any material danger of having the received record of the reception of the waves obscured.

For the purpose of these explorations, I find it desirable to make use of elastic pressure waves for producing the record. Such waves can be generated at the earth's surface by the transmission of mechanical vibratory or oscillatory forces to the earth, as for instance by the aid of explosions. The speed of transmission of the waves through the earth can easily be ascertained, and this information is another factor aiding in the solution of the trigonometric problem referred to hereinbefore. When such explosions are used, it is evident that waves of pressure are generated in addition to those which are reflected at the strata surfaces, as for instance the atmospheric pressure waves (or sound waves); and there are other waves which are propagated and travel directly without reflection to the receiving instrument; and again there are surface disturbances that travel at a slower rate than the pressure waves. It is the effects of these interferences which it is particularly desired to eliminate, and accordingly it is another object of my invention to provide a system of exploration that is not disturbed by them, and especially by the slowly moving surface disturbances.

One way in which this effect can be secured is by causing the receiving system to be selectively more strongly responsive to the pressure waves than to the disturbing waves due to the surface disturbances. To assist in this selectivity, I preferably cause the generation of a very abrupt series of waves, which are reflected and transmitted with substantially faithful accuracy, but which by trial has been ascertained to cause much less abrupt surface disturbances. It is therefore another object of my invention to provide a receiver most sensitive to abrupt variations.

I have found that electrical receivers are well suited for such pressure waves, such for example as a microphonic contact which can be placed to receive and be responsive to even very weak pressure variations caused by the elastic waves transmitted from the explosion. It is thus another object of my invention to provide a novel and simple electrical receiving device for such pressure waves.

It is still another object of my invention to make it possible to transmit the pressure waves through the earth in a uniform and a highly efficient manner.

My invention possesses many other advantageous features, some of which with the foregoing, will be set forth at length in the following description, where I shall outline in full that form of the invention which I have selected for illustration in the drawings accompanying and forming part of the present specification. Although I have shown in the drawings but one form of my invention, I do not desire to be limited thereto, since the invention as defined in the claims may have other forms also.

Referring to the drawings.

Figure 1:
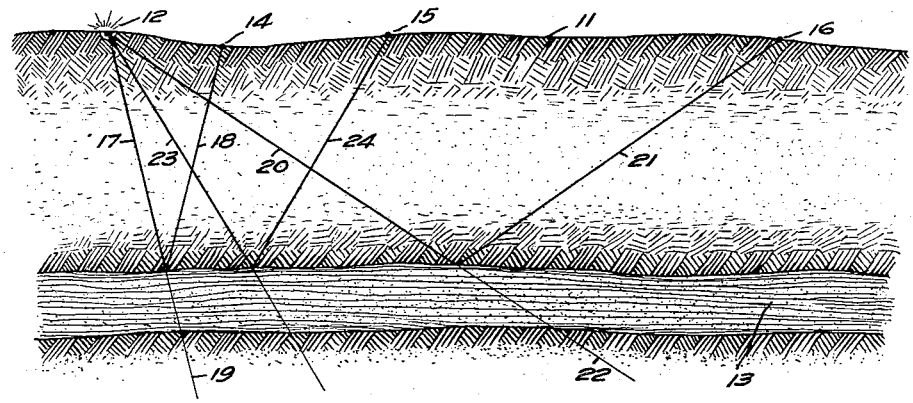
Figure 1 is a cross sectional view of a portion of the earth where explorations are to be made.

In Fig. 1 I show the surface of the earth 11, at one spot 12 of which an explosion is to be produced for propagating the pressure wave that is to be transmitted to a concealed stratum 13, and thence reflected back to the surface. I have shown three distinct locations of the receiver of the reflected wave, marked respectively 14, 15 and 16. If the receiver is located at 14, the paths of the transmitted and reflected waves are indicated at 17 and 18. The refracted wave 19 travels through the stratum 13. When the angle of incidence is small, as in this case, it is found that a large part of the energy of the wave is transmitted through the stratum 13, and a comparatively small part is reflected along path 18. Nevertheless, with sufficiently sensitive instruments, it is possible to receive and detect the reflected energy. Therefore, successive reflections, corresponding to successive layers could by this means be easily detected and segregated from each other and from the direct pressure wave, provided no other interfering waves be received.

However, if no extra precautions be taken, such signals of received energy are almost certain to be obscured. This is due to the fact that a less abrupt and slow moving surface disturbance also travels between points 12 and 14, and this disturbance probably arrives at point 14 almost simultaneously with the reflected energy along path 18. Interference is thus produced. Furthermore, atmospheric waves due to the explosion are also transmitted from 12, and these occurring as sound waves may have still further obscuring effects.

It might be suggested that at least part of these difficulties could easily be overcome by locating the receiver farther from the explosion point, such as at 16, whereby the difference in time of travel of the transmitted and reflected waves along paths 20 and 21, and of the travel of the surface disturbances would be sufficient to produce non-interfering records. Nevertheless such a solution of the problem is not practicable, for it is found that when a large angle of incidence is used (as must be the case for a large separation of points 12 and 16), almost all of the energy is reflected along path 21, and very little indeed is refracted along path 22. The result is that it is impossible to secure records of any layers or strata subsequent to or deeper than layer 13, for very little energy is transmitted thereto. Furthermore there are evident disadvantages in having such large physical separation between points 12 and 16.

Of course it may seem that a compromise of these bad conditions could be effected by causing the angle of incidence to have some intermediate value, whereby the paths of the transmitted and reflected energy would be as represented by lines 23 and 24. However, it is found that there is not a gradual continual increase in the reflected energy by shifting the receiver farther and farther from point 12; instead the reflected energy reduces to a minimum and then increases. Thus it comes about that at some intermediate position such as at 15, the receiver is subjected to a very small amount of energy.

Figure 2:
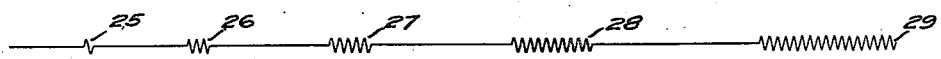
Fig. 2 is a representation of the record made by a recorder operating in conjunction with a receiver for the waves.

With the aid of my invention it is possible to utilize a small angle of incidence and yet segregate the reflected waves from the surface disturbances. A good example of how the waves affect a recorder when for example a large angle of incidence is used (corresponding to position 16), is represented by the record shown in Fig. 2. This record is produced on a strip moving past a pen at uniform velocity, by the aid of a recording instrument operating similarly to a seismograph. The abscissæ accordingly represent time, and rapid variations in the ordinates correspond to the wave energies received. A record of the time when the explosion occurs is obtained in any well known way, and is represented by the wavy line at 25. A short time later, the direct pressure wave is received, and represented by the wavy line 26. Later on, the reflected energy is received, and makes a record as shown at 27. The surface disturbances 28 are separated, since they travel much slower, and since the points 12 and 16 are spaced a considerable distance apart. The atmospheric disturbances 29 caused by the explosions come later. These atmospheric disturbances are difficult to eliminate entirely, especially for all reasonable spacings of the receiver from the place where the explosives are detonated.

Figure 3:
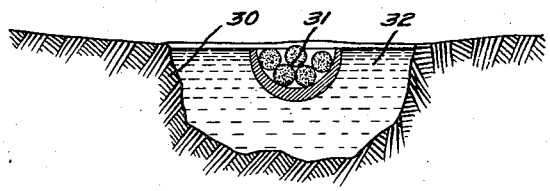
Fig. 3 is a cross sectional view of the earth taken where the explosions occur, and illustrates one feature of my invention, whereby an even transmission of the pressure to the earth is secured.

In accordance with my invention, the receiver and recorder are made selective to abrupt impulses, whereby the record 28 is reduced very materially in intensity. In the first place, I ensure that the explosion itself be as abrupt as possible. For this purpose I use an explosive which can be detonated at an extremely rapid rate, such as blasting gelatine or tri-nitro-toluene. These give extremely abrupt explosions, as compared with those due to powder or dynamite. Furthermore, to avoid a large loss of the impulse energy by crushing and friction in the earth immediately surrounding the explosion, I place the explosive 31 in a hollow such as 30 (Fig. 3) in which a liquid 32, such as water is placed. The pressure waves from the explosion are transmitted by this means to a larger area of the earth than if the explosive had been in direct contact with it, as by tamping. It is evident that this increase in area reduces the unit stresses, and consequently the tendency to crush the earth. A further advantage of the use of the water is that it maintains intimate contact with the surrounding earth; if the explosive be tamped into a hole, a certain amount of "give" in the tamped-in earth is bound to occur. This would be highly objectionable with my method, since much of the abruptness of the pressure wave would be lost, and some of the explosion energy would be needlessly absorbed by this give.

Figure 4:
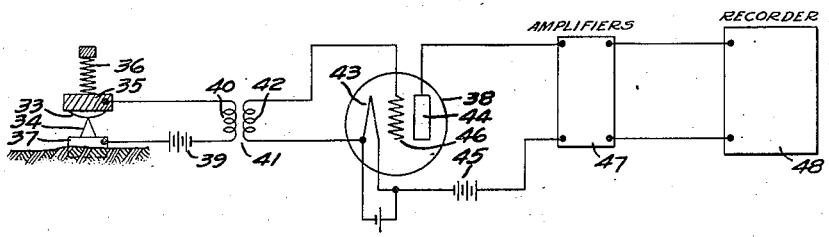
Fig. 4 is a diagram of a system embodying my invention.

An example of an electrical receiving and recording system for the earth vibrations is disclosed in Fig. 4. An appropriate element is utilized which is most sensitive to abrupt vibrations. For instance, a microphonic contact arrangement can be provided, including a pair of carbon blocks 33 and 34. The block 33 is weighted, as shown at 35, and is suspended on a spring 36. The weight and spring are so chosen that the carbon block 33, in the form of a button, just maintains contact with the carbon wedge 34. This wedge is carried by a plate 37 in contact with the earth's surface. It is evident that a very abrupt impulse will cause movement of block 34, but due to the weight 35 and the spring suspension 36, the block 33 remains substantially stationary, and there is accordingly a large variation in pressure between the two elements 33, 34 of the carbon contact. This in turn causes a correspondingly large variation in the resistance of a circuit including these contacts.

On the other hand, in case a less abrupt impulse is received, the contact 33 is free to follow the impulse variation more readily, and the result is that there is no longer the same variation in pressure as before. The microphone is thus most sensitive to abrupt impulses.

The carbon contacts are in series with a battery 39 or other source of electrical energy, as well as the primary 40 of a transformer 41. It is evident that the variations in current in circuit 33—34—40—39 due to the reception of abrupt pressure waves, cause corresponding variations in the E. M. F. induced in the secondary coil 42. These E. M. F. variations in turn are impressed upon the input circuit of any well-known form of amplifiers, the most convenient of which is a thermionic vacuum tube device such as 38.

This device has an electron emitting electrode 43 in the form of a heated filament, and a cold electrode or plate 44, to which the electrons are attracted. For attracting these electrons and thus cause a space current, a direct current source 45, such as a battery, is connected in the output circuit between the filament 43 and plate 44, whereby the plate is maintained positive with respect to the filament. The control of the space current is effected by the aid of a control electrode 46, which affects the state of electrical potential of the space, in accordance with its own potential as regards that of the filament. Even very slight variations in the difference in potential between filament 43 and grid 46 are sufficient to cause corresponding greater variations in the space current. All this is well understood, and requires at this stage no further description. It is now evident that when the secondary 42 is connected in circuit with electrodes 43 and 46, the variations in the E. M. F. induced in coil 42 serve to initiate the amplifying action of the tube 38.

Still further amplification may be provided for if desired, and this is indicated by the rectangle 47. Such amplifiers connect to the output side of tube 38, and they in turn pass the amplified impulse to a recorder 48. Preferably the amplifiers 47 are capacitively coupled, in order that they may be still more sensitive to abrupt variations in the electrical impulses transmitted to them.

The recorder 48 is preferably of the oscillograph type, in which a continuous record is traced on a moving film by the aid of a light ray. To produce this, a string galvanometer is used, the string being a conductor for the amplified current and being stretched so as to be affected by the poles of a magnet of constant strength. These recorders are also well known, and a further description is considered unessential.

When using the apparatus disclosed in Fig. 4, a record is obtained of the pressure wave which will be much more accentuated than the records due to the slower surface disturbances. In this way, the records can be easily interpreted to show which parts correspond to the reflected waves, which to the direct pressure wave and which to the surface disturbances.

I claim:

1. In a method of geologic exploration, creating a wave train having an abrupt wave front for transmission through the earth, and receiving at a distance from the creation of the wave train, only such waves as are of the same abrupt nature as said wave front.

2. In a method of geologic exploration for locating concealed strata below the earth's surface, creating a wave train having an abrupt wave front at a point above said strata, receiving energy reflected from the surface of submerged strata in such manner that the angle of incidence is small, whereby an appreciable amount of the wave front is reflected, and selecting for recording in a most pronounced manner, those waves received which are similar to said wave front.

3. In a system for geologic exploration, means for creating a wave train having an abrupt wave front for transmission through the earth, and a receiver at a distance from the place from which the wave train is created, said receiver being most sensitive to detect the abrupt front of said wave.

4. In a system for geologic exploration for locating concealed stratum below the earth's surface, means for creating a wave train having an abrupt wave front for transmission through the earth, and a receiver for energy reflected from a concealed stratum, said receiver being so close to the means for creating the impulse that the angle of incidence is small, and being most sensitive to said wave front.

5. In a system for geologic explorations, a microphonic receiver comprising a pair of contacts, one of said contacts being in physical cinnection with the earth so as to respond to pressure impulses.

6. In a system for geologic explorations, a microphonic receiver comprising a pair of contacts, one of said contacts being in physical connection with the earth so as to respond quickly to all pressure impulses, and the other being resiliently suspended and of such mass that it responds slowly to such impulses.

7. In a system for geologic explorations, means for producing an explosion whereby pressure impulses are created in the earth, a receiver located at a distance from the place where the impulses are created, for transforming said impulses into variations in an electrical circuit, and means for making a time record by the aid of said variations.

8. In a system for geologic explorations, means for producing an explosion whereby abrupt pressure impulses are created in the earth, and a receiver for transforming said impulses into variations in an electrical circuit, said receiver comprising a microphone having a pair of contacts, one movable quickly in response to impulses received, and the other responding slowly thereto.

9. In a system for geologic exploration, the process of creating abrupt pressure impulses in the earth, which comprises detonating a highly explosive material, and transmitting the pressures to the earth through a liquid.

10. In a system for geologic exploration, the process of creating abrupt pressure impulses in the earth, which comprises placing a highly explosive material in a hollow, placing a liquid between the material and the earth, and detonating the material.

11. In a method of geological exploration, detonating an explosive at the surface of the earth, converting energy from said detonation into a wave train having a pronounced abrupt wave front, and transmitting said wave train through the earth.

12. In a method of geological exploration, detonating an explosive at the surface of the earth, converting energy from said detonation into a wave train having a pronounced abrupt wave front, transmitting said wave train through the earth, and receiving at a distance from the creation of the wave train, only such waves as are of the same abrupt nature as said wave front.

13. In a system for geological explorations, means adapted to effect current variations in response to variations in the pressure applied to two points thereof, one of said points having a physical pressure transmitting connection with the ground, the other of said points having physical connection with a mass which is independent of vibrations propagated thru the ground, and an electron relay adapted to amplify current variations set up by said means.

In testimony whereof, I have hereunto set my hand.

FRANK RIEBER.